US006955131B2

(12) United States Patent
Beaujot et al.

(10) Patent No.: US 6,955,131 B2
(45) Date of Patent: Oct. 18, 2005

(54) DUAL MATERIAL PLACING APPARATUS WITH DEPTH ADJUSTING PIVOT POINT

(75) Inventors: Patrick M. Beaujot, Langbank (CA); Penny M. Howells, Wolseley (CA); Bruce W. Wilton, Langbank (CA); Brian F. Dean, Langbank (CA); David R. Duke, Langbank (CA); A. Brian Kent, Langbank (CA)

(73) Assignee: 101039130 Saskatchewan Ltd., Saskatchewan (CA)

( * ) Notice: Subject to any disclaimer, the term of this patent is extended or adjusted under 35 U.S.C. 154(b) by 0 days.

(21) Appl. No.: 10/424,002

(22) Filed: Apr. 25, 2003

(65) Prior Publication Data

US 2004/0211346 A1 Oct. 28, 2004

(51) Int. Cl.[7] .............................. A01C 7/00; A01C 7/06
(52) U.S. Cl. ........................... 111/187; 111/77; 111/170
(58) Field of Search ..................... 111/77–85, 170–177, 111/186–189, 192, 129, 924, 73; 172/558, 604, 17, 176, 397, 705, 706

(56) References Cited

U.S. PATENT DOCUMENTS

| 2,842,078 A | | 7/1958 | Immesoete |
| 2,920,587 A | | 1/1960 | Shriver |
| 4,116,140 A | | 9/1978 | Anderson et al. |
| 4,417,530 A | * | 11/1983 | Kopecky ........................ 111/73 |
| 4,831,945 A | * | 5/1989 | Neumeyer .................... 111/73 |
| 5,331,907 A | | 7/1994 | Beaujot |
| 5,396,851 A | | 3/1995 | Beaujot |
| 6,032,593 A | * | 3/2000 | Wendling et al. ........... 111/187 |
| 6,142,085 A | | 11/2000 | Drever et al. |
| 2002/0189513 A1 | | 12/2002 | Beaujot |

FOREIGN PATENT DOCUMENTS

| CA | 1239835 | 8/1988 |
| CA | 2083924 | 5/1994 |
| CA | 2069081 | 1/1996 |

OTHER PUBLICATIONS

What should we require of a combination seeding–drill, *Soil and Forest*, No. 10, Reijo Heinonen, 1963, pp. 1–4.
Juko Brochure: Juko gives a higher yield: Trailed combine placement drills, 1978, pp. 1–5.

* cited by examiner

*Primary Examiner*—Robert E Pezzuto
(74) *Attorney, Agent, or Firm*—Kolisch Hartwell, P.C.

(57) ABSTRACT

A dual material dispensing assembly mountable to a frame for pulling assembly across the ground. The assembly includes an elongate main member having a first end mountable to the frame and a second end pivotally connected to a packer arm at a pivotable joint. A first dispensing implement for dispensing fertilizer to a first depth in the ground is mounted to the main member between the first and second ends. A second dispensing implement for dispensing seed to a second depth, different than the first depth, is mounted to the packer arm. The pivotable joint is intermediate the first and second dispensing implements. There is also a lock for preventing pivoting of the pivotable joint. A packer wheel is mounted to the packer arm at a second end whereby pivoting of the packer arm with respect to the main member at the pivotable joint acts to vary the first and second depths of the by the same amount.

17 Claims, 6 Drawing Sheets

DUAL MATERIAL PLACING APPARATUS WITH DEPTH ADJUSTING PIVOT POINT

FIELD OF THE INVENTION

This invention relates to planting equipment, and, more particularly, to an assembly for placing fertilizer and seed at different planting depths in the ground.

BACKGROUND OF THE INVENTION

Dual material planting equipment for efficiently delivering both fertilizer and seed into furrows in the ground are well known. Examples of such planting equipment are disclosed in U.S. Pat. Nos. 5,331,907 and 5,396,851 both to Norbert Beaujot. These patents describe the general planting process of opening a first furrow in the ground into which fertilizer is deposited and opening a second furrow laterally and vertically spaced from the first into which seed is deposited. Generally, the placement of fertilizer and seed is accomplished by separate material dispensing implements such as knives or discs that are towed across a field by a tractor or suitable vehicle equipped with a supply of fertilizer and seed.

Agronomic research indicates that the two furrows should preferably have a lateral separation of approximately 38 mm (1.5 inches) and a vertical spacing of approximately 19 mm (0.75 inches) for optimal germination and growing conditions. Therefore, the material dispensing implements of the planting equipment need to be vertically and horizontally spaced, correspondingly.

Once the fertilizer and seed have been deposited, a packer wheel compresses the soil that has flowed back into the furrows to bury the fertilizer and seed bringing the soil into contact with the seed, which is essential for germination, and sealing the soil surface over the furrows. The depth of the seed and fertilizer placement is measured from the compacted surface left by the packer wheel.

The depth of the seed and fertilizer placement below the soil surface is adjustable to accommodate different fertilizer and seed combinations, different seed types, and different soil type and moisture. In prior art equipment for performing the planting process described above, the optimal relative vertical spacing of the fertilizer and seed dispensing implements tends to be altered when vertical adjustments are made. For example, vertical adjustment of the forward fertilizer dispensing implement generally involves independent vertical movement of the implement, while vertical adjustment of the rearward seed dispensing implement relies on pivoting of the arm supporting the rearmost packer wheel. At the same time, in prior art designs, pivoting of the packer wheel arm also affects the vertical position of the forward fertilizer dispensing implement but not to the same extent as the rearmost seed dispensing implement. In other words, with prior art planting equipment, it is usually necessary to independently adjust the position of both fertilizer and seed dispensing implements when adjusting the vertical depth of planting to maintain the same vertical distance between the implements, and hence, the same optimal vertical separation between the fertilizer and seed furrows.

SUMMARY OF THE INVENTION

To address this problem with respect to the optimal vertical spacing of the fertilizer and seed, we have developed a novel dual material dispensing assembly that maintains a constant relative vertical separation between first and second material dispensing implements regardless of the depth to which the assembly to set to plant. For example, in the assembly of the present invention, when the second material dispensing assembly's depth is adjusted, the first material dispensing assembly's depth is automatically adjusted by an equal amount. This is achieved principally by putting a depth adjusting pivot point from which the packer arm extends intermediate the mounting location of the first material dispensing implement and the second material dispensing implement.

Accordingly, the present invention provides a dual material dispensing assembly mountable to a frame comprising:

an elongate main member having a first end mountable to the frame and a second end;

a first dispensing implement for dispensing a first material to a first depth in the ground mounted to the main member between the first and second ends;

an arm pivotally mounted to the second end of the elongate main member at a first end of the arm by a pivotable joint;

a second dispensing implement mounted to the arm for dispensing a second material to a second depth with the pivotable joint being intermediate the first and second dispensing implements;

a lock for preventing pivoting of the pivotable joint; and a ground compressing member mounted to the arm at a second end of the arm whereby pivoting of the arm with respect to the main member at the pivotable joint acts to vary the first and second depths by the same amount.

The present invention also provides a dual material dispensing assembly mountable to a frame comprising:

an elongate main member having a first end mountable to the frame and a second end;

a first dispensing implement for dispensing a first material to a first depth in the ground pivotally mounted to the main member between the first and second ends;

an arm pivotally mounted to the second end of the elongate main member at a first end of the arm by a pivotable joint;

a second dispensing implement for dispensing a second material to a second depth different than the first depth by a predetermined distance, the second dispensing implement being mounted to the arm with the pivotable joint being intermediate the first and second dispensing implements;

a lock for preventing pivoting of the pivotable joint; and a ground engaging member mounted to the arm at a second end of the arm whereby changing the angle between the arm and the main member varies the first and second depths while maintaining the pre-determined distance between first and second depths.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 1:
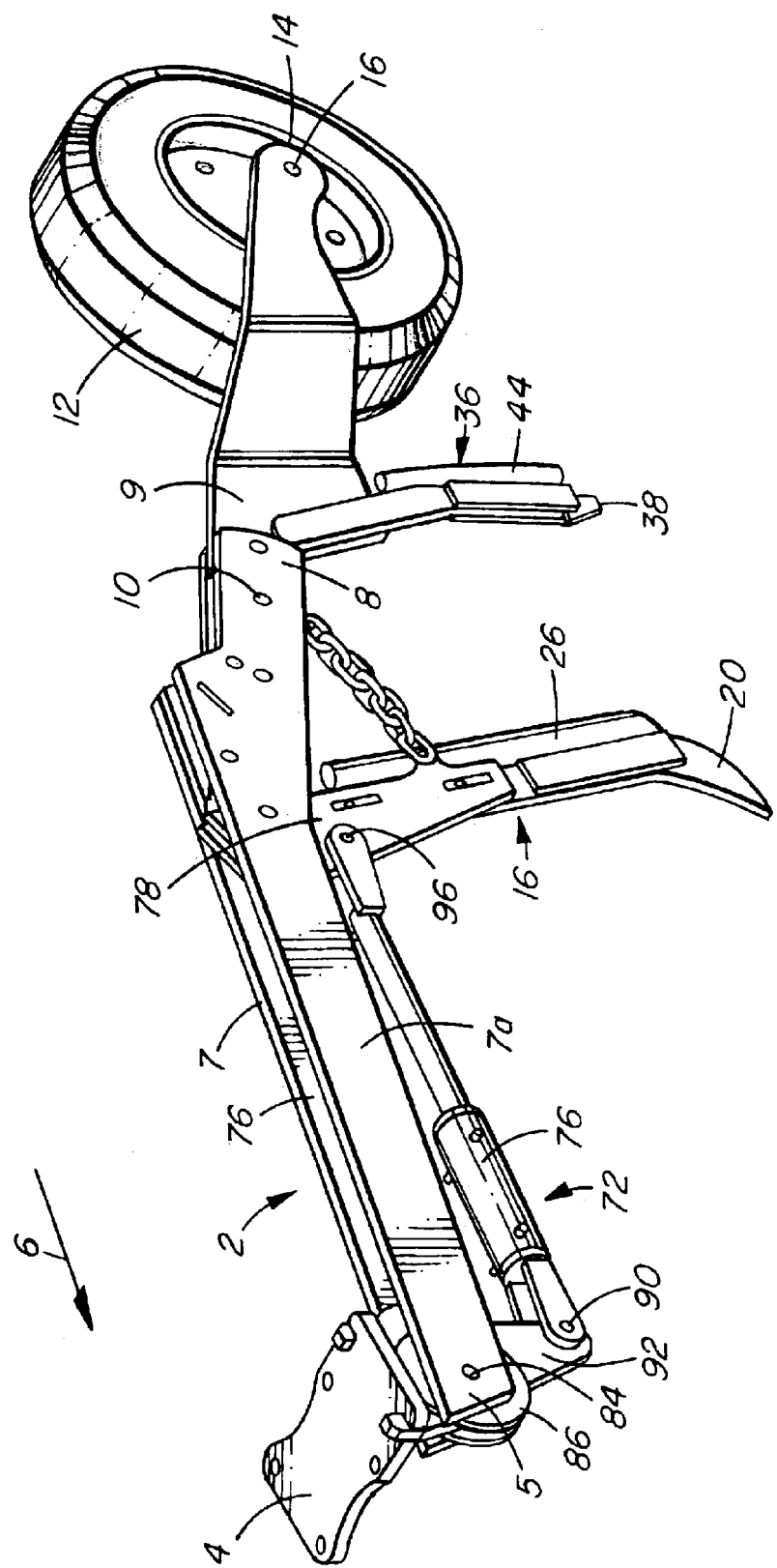
FIG. 1 is a perspective view of a preferred embodiment of the dual material placement assembly according to the present invention.
Figure 2:
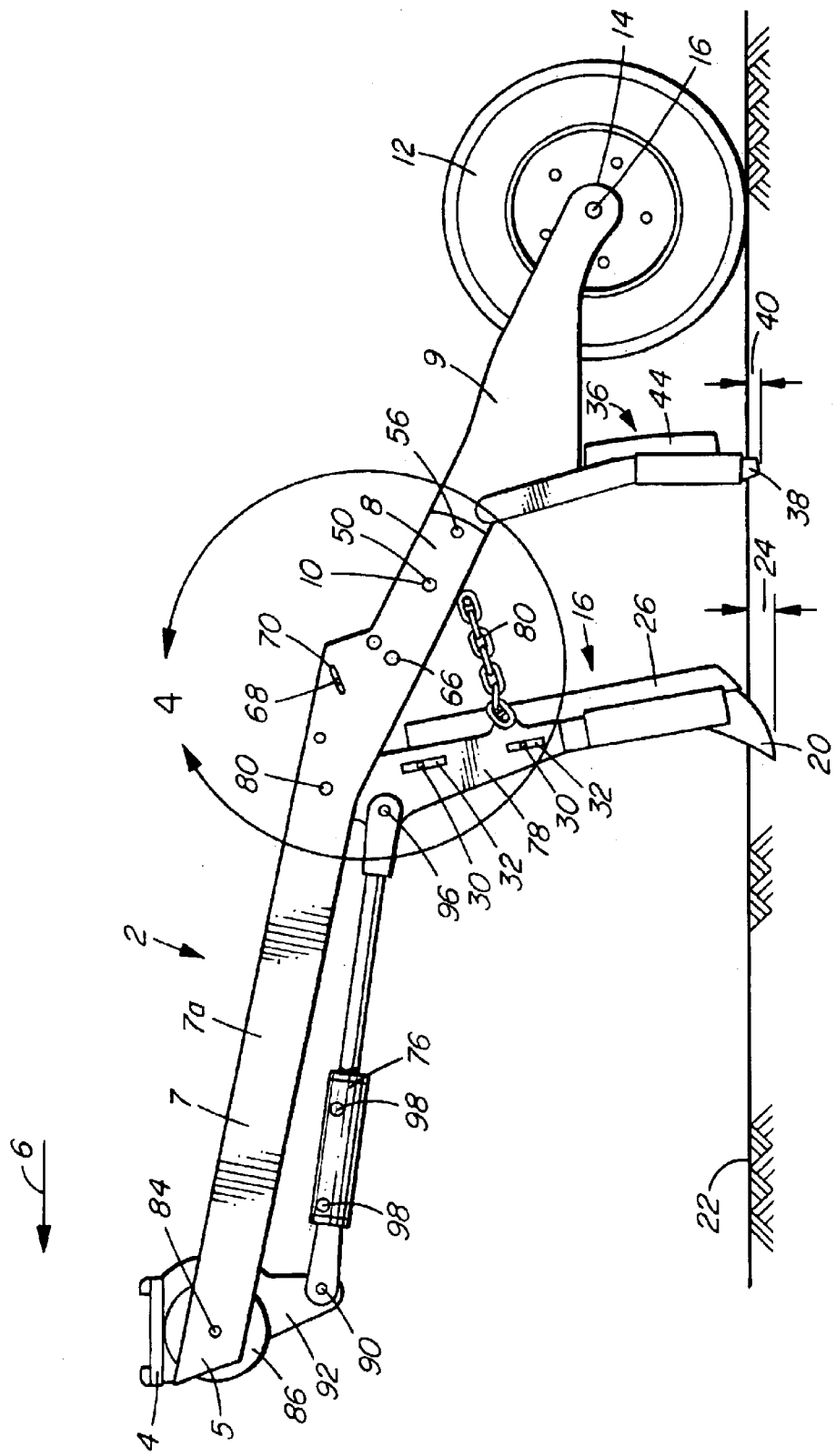
FIG. 2 is a side elevation view of the apparatus of FIG. 1.
Figure 3:
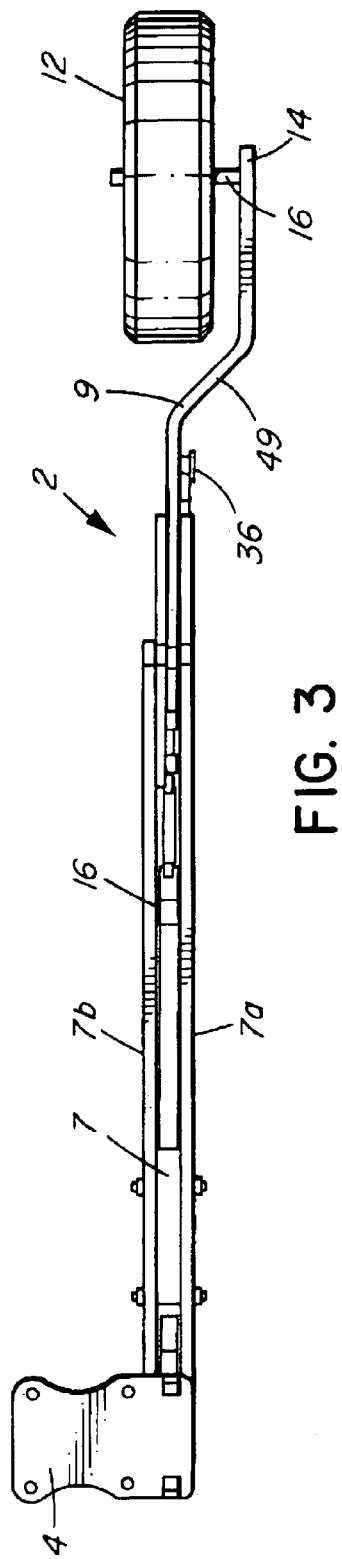
FIG. 3 is a top plan view.

Referring to FIGS. 1, 2 and 3, there is shown in perspective, a preferred embodiment of the dual material dispensing assembly 2 according to the present invention. At least one assembly 2 is pivotally mounted to a conventional frame (not shown) by bracket 4 positioned at a first end 5 of an elongate main member 7. The frame acts to support first end 5 above the ground. The distal, second end 8 of the main member 7 is supported by an arm 9 pivotally mounted at pivotable joint 10 to the main member. Arm 9 supports a ground engaging or compressing member in the form of a wheel element 12 at the second end 14 of the arm. Wheel element 12 is rotatably mounted to arm 9 by an axle and bearings 16 to permit free rotation of the wheel element over the ground. The frame is towed across a field by a tractor or other suitable vehicle to pull the at least one attached assembly 2 over the field in the direction indicated by arrow 6.

A first dispensing implement 16 for dispensing a first material, such as fertilizer, to a first depth in the ground is mounted to main member 7 between the first end 5 and the second end 8. In the illustrated embodiment, the first dispensing implement includes a knife 20 for forming a first furrow in the ground. In FIG. 2, knife 20 is shown penetrating ground 22 to create a first furrow of depth 24. Immediately behind knife 20, there is a tube 26 for depositing a first material, in this case fertilizer, into the first furrow from a supply source (not shown). Such a supply tube is conventional. Preferably, knife 20 is mounted to the main member for independent adjustment of depth 24. In the illustrated embodiment, this involves knife 20 being mounted to a downwardly extending pivot bracket 78 via a pair of pins 30 movable in slots 32 formed in the bracket plate to adjust the vertical position of the knife.

Figure 2A:
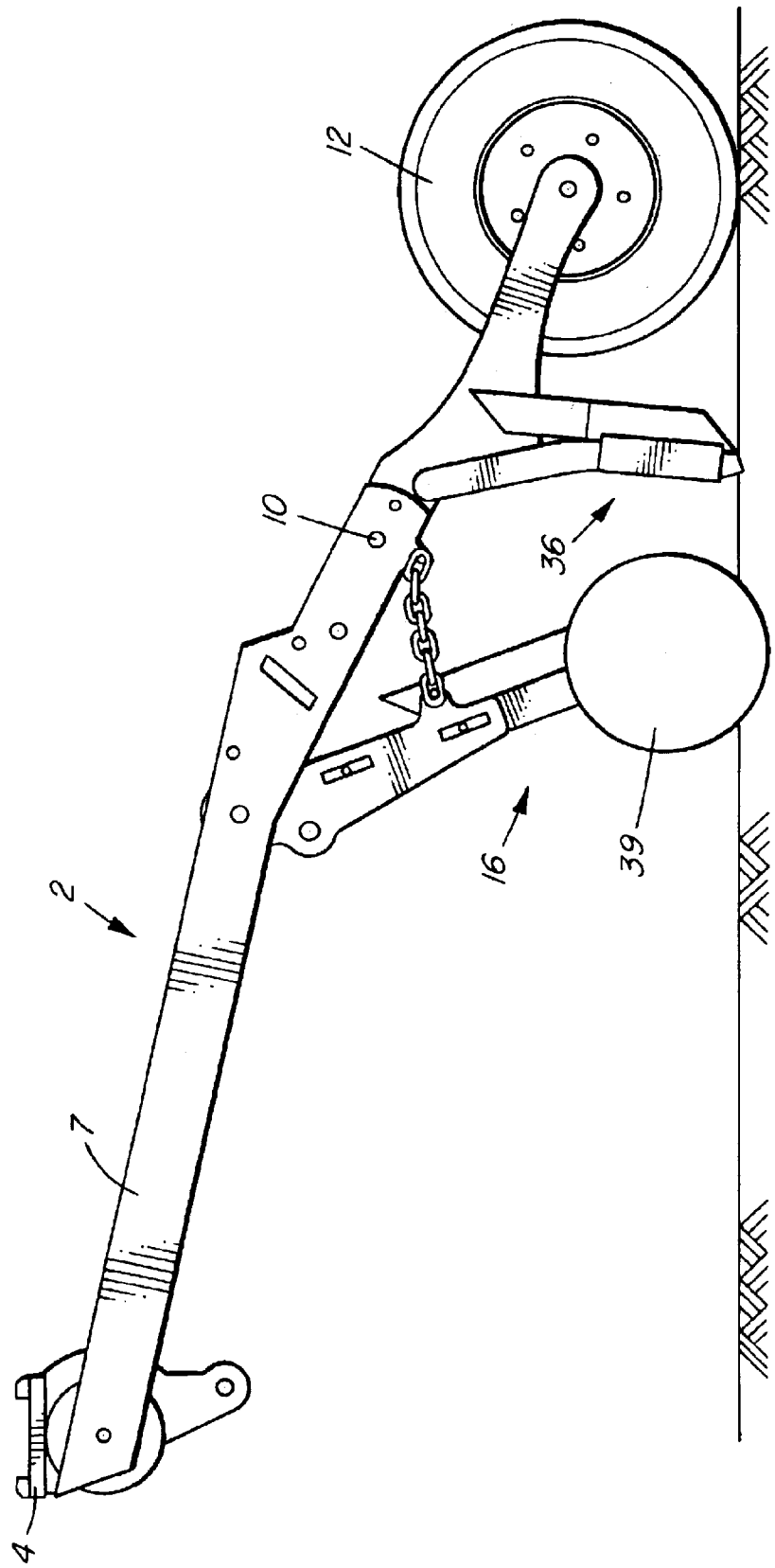
FIG. 2A is a side elevation view of an alternative embodiment of the apparatus that employs a disc to dispense fertilizer into the ground.

A second dispensing implement 36 for dispensing a second material, such as seed, to a second depth different than the first depth 24 is mounted to arm 9. In the illustrated embodiment, the second dispensing implement includes a knife 38 for forming a second furrow in the ground. As best shown in FIG. 2, knife 38 is shown penetrating ground 22 to create a second furrow of depth 40. Immediately behind knife 38, there is a tube 44 for depositing a second material, in this case seed, into the second furrow from a supply source (not shown). Such a supply tube is conventional. Preferably, knife 38 is fixedly mounted to arm 9. Vertical adjustment knife 38 is accomplished by pivoting of arm 9 about pivotable joint 10. Alternatively, additional vertical adjustment of knife 38 may be performed by vertical movement of knife 38. Referring to FIG. 3, which is a plan view of the apparatus of the present invention, it can be seen that second dispensing implement 36 is mounted to arm 9 to be laterally offset from first dispensing implement 16 in order to laterally space the first and second furrows by approximately 38 mm (1.5 inches) according to recommended agronomic practice. In addition, the top view clearly shows that arm 9 is preferably formed with angled section 49 after second dispensing implement 36 to position wheel element 12 over the first and second furrows in order to perform its packing function. While wheel element 12 has been shown in the drawing, a person skilled in the art will understand that alternative ground compressing members are possible such as a skid. Furthermore, while the illustrated embodiment shows material dispensing assemblies that include a knife, it will be appreciated that other equipment for forming a furrow in the ground such as coulters, discs or blades can be used with the apparatus of the present invention. For example, FIG. 2A illustrates an alternative embodiment in which knife 38 has been replaced by a disc 39. All other elements of the apparatus are identical to the embodiment employing a knife 38.

Figure 5:
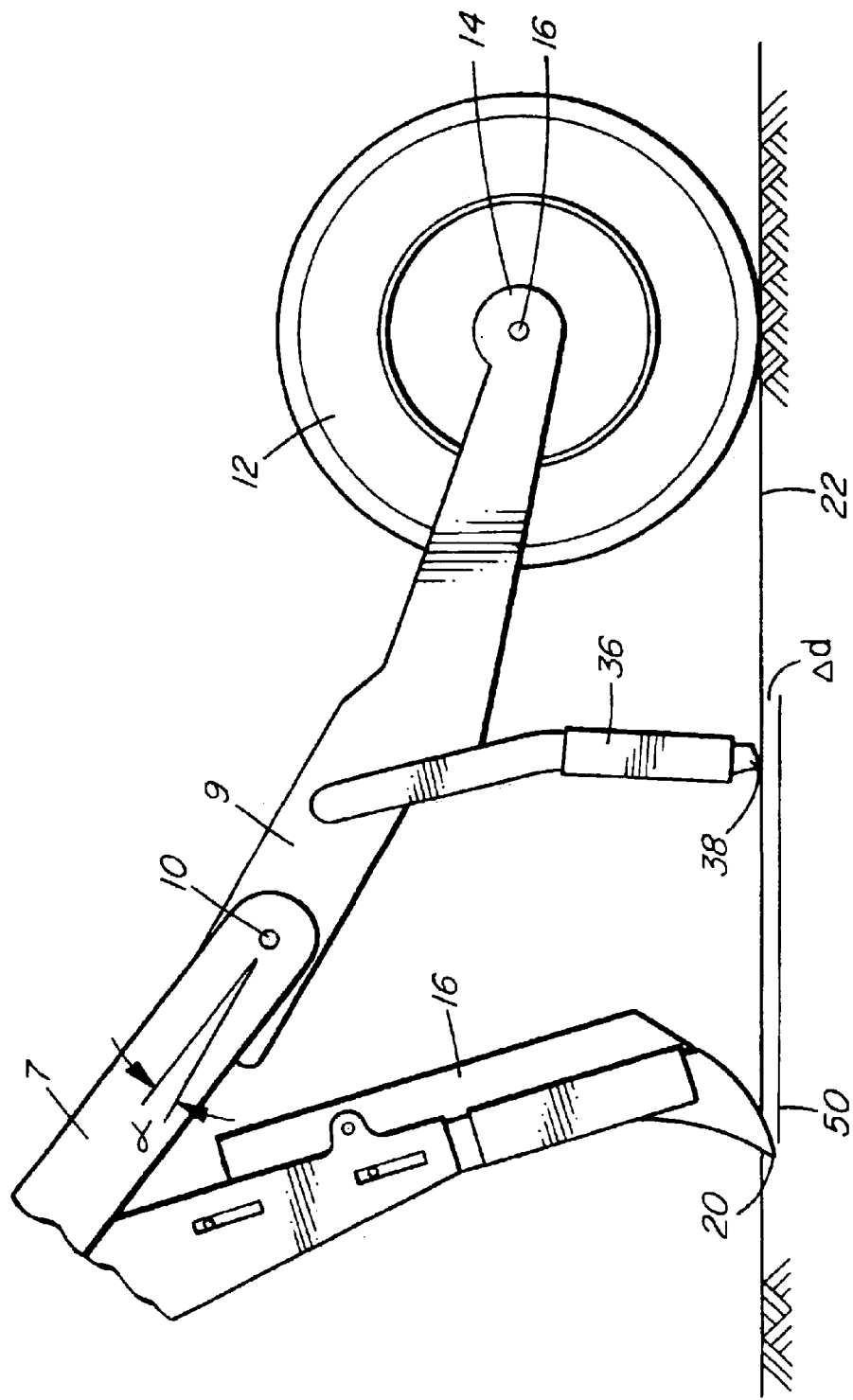
FIG. 5 is a schematic detail view of the apparatus of the present invention set at a first shallow depth of planting.
Figure 6:
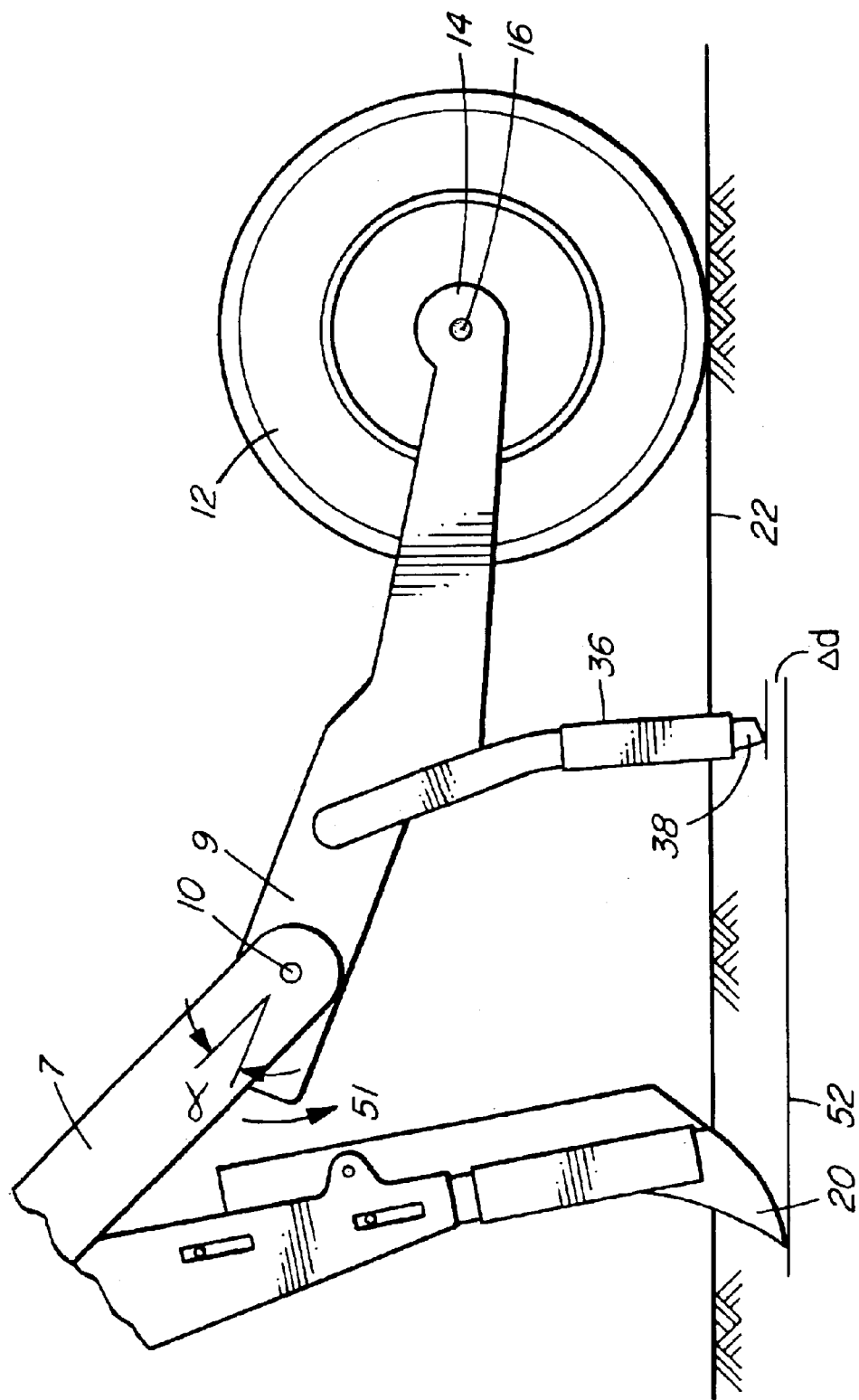
FIG. 6 is a schematic detail view of the apparatus of the present invention set at a second deeper depth of planting to show the pivoting of the packer arm with respect to the main body.

The placement of pivotable joint 10 intermediate first dispensing implement 16 and second dispensing implement 36 allows for pivoting of arm 9 with respect to main member 7 such that the first and second depths of knives 20 and 38 are always separated by the same distance. This is best illustrated by referring to FIGS. 5 and 6 which show schematically a detail view of the rear end of the apparatus at two different vertical positions of the first and second dispensing implements 16 and 36, respectively. FIG. 5 shows a configuration in which knife 38 of the second dispensing implement 36 is just in contact with ground 22 and knife 20 of the first dispensing implement 16 is slightly below ground 22 at depth 50. The vertical distance Δd between the first and second knives is preferably set to be the optimal vertical separation distance of 19 mm (0.75 inches) mentioned previously. FIG. 6 shows a different configuration after pivoting of arm 9 in a counterclockwise direction indicated by arrow 51 about pivotable joint 10 to increase the angle α between main member 7 and arm 9. Knives 38 and 20 have both moved downwardly to new depths 54 and 52, respectively, however, the vertical separation distance Δd between the knife depths remains constant. Another way to look at it is to consider that the depths of both knives 38 and 20 have been varied by the same amount.

During planting operations, it is necessary that pivotable joint 10 cannot rotate so that the relative vertical positions of knives 20 and 38 is maintained once set. The apparatus of the present invention is provided with a lock to prevent rotation of pivotable joint 10 once the desired vertical separation Δd between knives is established. A preferred lock for the specific embodiment of the invention illustrated in the drawings will be described below. It will be understood that there are many alternative arrangements to prevent rotation of pivotable joint 10 which qualify as a lock according to the present invention.

In the illustrated embodiment, as best shown in FIGS. 1 and 3, main member 7 is preferably formed from a pair of elongate, spaced parallel beams 7a and 7b. These parallel beams define an open space therebetween to receive various components which are sandwiched between the beams. For example, a first end of arm 9 is housed between beams 7a and 7b adjacent pivotable joint 10. A pin 50 extending through aligned holes in beams 7a, 7b and arm 9 defines pivotable joint 10. Ultra high molecular weight (UHMW) material wear plates 51 can be positioned on either side of arm 9 adjacent pin 50 to assist in smooth pivoting of the joint during depth adjustment. This arrangement acts to protect pivotable joint 10 from the environment and stabilizes arm 9 against lateral deflection forces.

Figure 4:
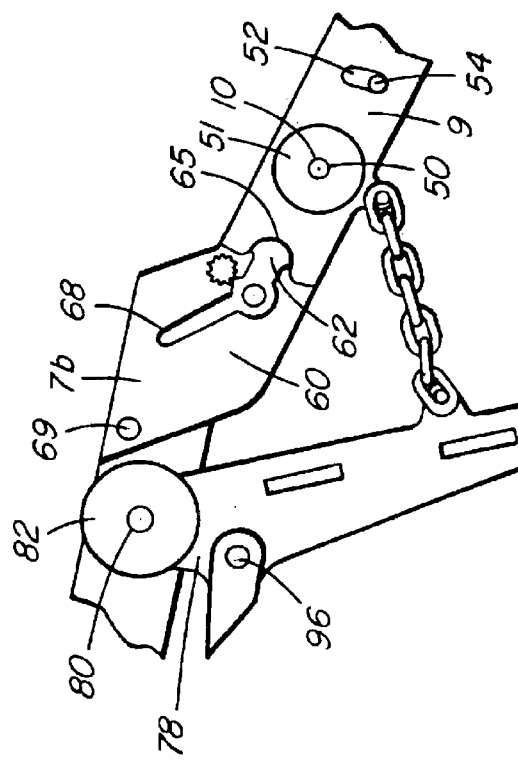
FIG. 4 is a detail view taken at 4 of FIG. 2 showing a preferred locking arrangement for apparatus of the present invention.

FIG. 4 is a detail view taken at region 4 in FIG. 2 of a preferred lock arrangement. In FIG. 4, beam 7a has been cut away to show components that would normally be concealed in the space between beams 7a and 7b. Beams 7a and 7b normally overlap and sandwich arm 9 therebetween. The lock for pivotable joint 10 is formed by a nut and bolt arrangement. A threaded shaft 52 extends from beam 7b to beam 7a through a slot 54 formed in arm 9. Slot 54 is arcuate to accommodate pivoting movement of arm 9 with respect to the beams. Shaft 52 is fixed to beam 7b and has a free end that protrudes through an opening in beam 7a. A correspondingly threaded fastener, such as a nut 56, tightenable onto the protruding portion of shaft 52 acts to urge beams 7a and 7b together to clamp arm 9 between the two beams to prevent pivoting of the arm with respect to the beams.

FIG. 4 also shows a preferred arrangement for adjusting the position of arm 9 about pivotable joint 10. Pivotally mounted between beams 7a and 7b, there is provided an actuator 60 having an arm 62 that engages a notch 65 in the upper end of arm 9. Any rotation of the actuator 60 is transmitted to arm 9 via arm 62. Actuator 60 is formed with a post 66 that protrudes through an opening in beam 7a or 7b to provide external access for rotation of the actuator 60. The exposed end of post 66 is preferably formed with means to permit rotation of the post and actuator 60 such as a hex head or hex cavity. An indicator 68 extends from the opposite side of actuator 60 to arm 62. Indicator 68 is viewable through slots 70 formed in beams 7a and 7b. A calibrated scale is associated with each slot to provide a convenient indication of the depth of placement of the second material, in this case, seed and, accordingly, the depth of placement of the first material, in this case, fertilizer. For example, the calibrated scale would include indicia in a range between ⅛ inch to 2 inches to indicate seed planting depths for conventional zero-till planting applications. A user is generally interested in planting the seed to a prescribed depth, and the fertilizer is automatically spaced vertically and horizontally from the seed using the apparatus of the present invention. Bushing spacer 69 is preferably provided between beams 7a and 7b adjacent indicator 68 to ensure that the spacing between beams 7a and 7b is maintained to permit free movement of the indicator arm.

Referring to FIG. 1, it is preferable that the assembly of the present invention is provided with a biasing system 72 to exert a ground penetrating force to the first and second dispensing implements 16 and 36, respectively, and a compressing force to the wheel element 12 other than relying on gravity. In the illustrated arrangement, the biasing system comprises an adjustable hydraulic cylinder 76. Cylinder 76 extends between mounting bracket 4 at the first end 5 of the main member 7 and pivot bracket 78 extending from the main member 7. As previously mentioned, pivot bracket 78 supports the first dispensing implement 16. As best shown in FIG. 4, pivot bracket 78 is pivotally supported between beams 7a and 7b by a pivot pin 80 extending between the beams and through the upper end of the bracket. UHMW wear plates 82 are preferably inserted between the pivot bracket 78 and beams 7a and 7b to reduce friction. The ends of beams 7a and 7b are pivotally mounted to bracket 4 by pin 84. Again, UHMW wear plates 86 are preferably provided.

At one end, hydraulic cylinder 76 is pivotally mounted at 90 to a dependent flange 92 of mounting bracket 4. At the other end, hydraulic cylinder 76 is pivotally connected at 96 to pivot bracket 78. Hydraulic lines (not shown) connectable to cylinder ports 98 control the extension and retraction of the cylinder to maintain the biasing force. Hydraulic cylinder 76 preferably includes an adjustable overload pressure valve whereby an excess force applied to the first dispensing implement 16 will activate the valve to release the excess pressure allowing implement 16 to pivot rearwardly about pivot pin 80 with pivot bracket 78. In other words, pivot bracket 78 acts as a trip release mechanism to permit pivoting of the first dispensing member out of the way of an obstacle encountered in the ground. Chain 80 extending between pivot bracket 78 and beam 7a, 7b or arm 9 is provided to limit the forward travel of fertilizer knife 20 and pivot bracket 78.

In use, the apparatus of the present invention requires independent adjustment the first and second dispensing implements 16 and 36 to establish a desired vertical separation distance between knives 20 and 38 which define the depth of the furrows into which the fertilizer and seeds will be deposited. This is generally accomplished by adjusting the vertical position of knife 20 on pivoting bracket 78 while knife 38 remains fixed. Once the desired vertical separation distance $\Delta d$ is established, it is simply a matter of adjusting the planting depth of the second dispensing implement 36 by pivoting at pivotable joint 10 to automatically adjust the first dispensing implement 16 by an equal amount. Adjusting the planting depth of the second dispensing implement 36 (i.e. the seed planting depth) involves:

1. Loosening the nut 56 on shaft 52 to unlock pivotable joint 10.
2. Adjust the relative angle $\alpha$ between arm 9 and main beams 7a and 7b by rotating post 66.
3. Observing the position of indicator 68 in slot 70 until the desired planting depth is indicated on the calibrated scale.
4. Tightening nut 56 on shaft 52 to lock the pivotable joint.

In the foregoing description, it has been stated that the first and second material dispensing implements deposit fertilizer and seed, respectively, to different depths in the ground separated by vertical distance $\Delta d$. While this is preferred practice, it will be appreciated that the assembly of the present invention can be operated with the dispensing implements configured to deposit fertilizer and seed to the same depth in the ground. In such an arrangement, once the implements are set to the same depth with the vertical distance $\Delta d$ between implements being zero, any adjustment of the planting depth by pivoting of packer arm 9 about pivotable joint 10 will result in both dispensing implements being adjusted to the same depth.

Although the present invention has been described in some detail by way of example for purposes of clarity and understanding, it will be apparent that certain changes and modifications may be practised within the scope of the appended claims.

We claim:

1. A dual material dispensing assembly mountable to a frame comprising:

an elongate main member having a first end mountable to the frame and a second end;

a first dispensing implement for dispensing a first material to a first depth in the ground mounted to the main member between the first and second ends;

an arm pivotally mounted to the second end of the elongate main member at a first end of the arm by a pivotable joint;

a second dispensing implement mounted to the arm for dispensing a second material to a second depth with the pivotable joint being intermediate the first and second dispensing implements;

a lock for preventing pivoting of the pivotable joint; and a ground compressing member mounted to the arm at a second end of the arm whereby pivoting of the arm with respect to the main member at the pivotable joint acts to vary the first and second depths by the same amount.

2. A dual material dispensing assembly as claimed in claim 1 in which the first and second dispensing implements are arranged to dispense materials to first and second depths that are different.

3. A dual material dispensing assembly as claimed in claim 1 in which the first and second dispensing implements are arranged to dispense materials to first and second depths that are the same.

4. A dual material dispensing assembly as claimed in claim 1 in which the first dispensing implement comprises:
   a knife for forming a first furrow in the ground;
   a tube mounted adjacent the knife for depositing material from a first material source into the first furrow.

5. A dual material dispensing assembly as claimed in claim 1 in which the first dispensing implement is mounted to the main member for independent adjustment of the first depth.

6. A dual material dispensing assembly as claimed in claim 1 in which the second dispensing implement comprises:
   a knife for forming a second furrow in the ground;
   a tube mounted adjacent the knife for depositing material from a first material source into the second furrow.

7. A dual material dispensing assembly as claimed in claim 1 in which the second dispensing implement is mounted to the arm for independent adjustment of the second depth.

8. A dual material dispensing assembly as claimed in claim 1 in which the first material dispensing implement dispenses fertilizer and the second material dispensing implement dispenses seeds.

9. A dual material dispensing assembly as claimed in claim 1 in which the second material dispensing implement is positioned relative to the first material dispensing implement to be laterally offset therefrom.

10. A dual material dispensing assembly as claimed in claim 1 including a biasing system to exert a ground penetrating force to the first and second dispensing implements and a compressing force to the ground compressing member.

11. A dual material dispensing assembly as claimed in claim 10 including a mounting bracket at the first end of the main member and a pivot bracket extending from the main member to support the first dispensing implement with the biasing system comprising a hydraulic cylinder connected between the mounting bracket and the pivot bracket.

12. A dual material dispensing assembly as claimed in claim 11 in which the hydraulic cylinder includes an overload pressure sensor whereby an excess force applied to the first material dispensing element causes the pivot bracket to act as a trip release mechanism to permit pivoting of the first dispensing member if an obstacle is encountered in the ground.

13. A dual material dispensing assembly as claimed in claim 1 in which the ground compressing member comprises a wheel element rotatably mounted to the second end of the arm.

14. A dual material dispensing assembly as claimed in claim 1 in which the main member and the arm overlap at overlapping portions, and the lock comprises a threaded shaft extending from one of the main member and the arm and movable in a slot formed in the other of the main member and the arm, and a threaded fastener tightenable onto the shaft to clamp the overlapping portions of the main member and the arm together to prevent pivoting at the pivotable joint.

15. A dual material dispensing assembly as claimed in claim 1 including an indicator with a calibrated scale to indicate the depth adjustment.

16. A dual material dispensing assembly as claimed in claim 1 in which the main member comprises a pair of first and second spaced, parallel beams that sandwich the arm therebetween, and the lock comprises a threaded shaft extending between the first beam and the second beam through a slot formed in the arm with a threaded fastener tightenable onto the shaft to clamp the arm between the two beams to prevent pivoting of the arm with respect to the beams.

17. A dual material dispensing assembly mountable to a frame comprising:
   an elongate main member having a first end mountable to the frame and a second end;
   a first dispensing implement for dispensing a first material to a first depth in the ground pivotally mounted to the main member between the first and second ends;
   an arm pivotally mounted to the second end of the elongate main member at a first end of the arm by a pivotable joint;
   a second dispensing implement for dispensing a second material to a second depth different than the first depth by a predetermined distance, the second dispensing implement being mounted to the arm with the pivotable joint being intermediate the first and second dispensing implements;
   a lock for preventing pivoting of the pivotable joint; and
   a ground engaging member mounted to the arm at a second end of the arm whereby changing the angle between the arm and the main member varies the first and second depths while maintaining the predetermined distance between first and second depths.

* * * * *